AUTOMATIC FREQUENCY CONTROL FOR A SINGLE SIDEBAND RECEIVER

Filed March 13, 1968 2 Sheets-Sheet 1

INVENTORS

GERALD F. MAYEFSKIE AND
EMORY RICHARDSON

BY Brady, O'Boyle & Gates

ATTORNEYS

INVENTORS
GERALD F. MAYEFSKIE AND
EMORY RICHARDSON

BY Brady, O'Boyle & Gates
ATTORNEYS

United States Patent Office 3,543,164

Patented Nov. 24, 1970

3,543,164

AUTOMATIC FREQUENCY CONTROL FOR A SINGLE SIDEBAND RECEIVER

Gerald F. Mayefskie and Emory Richardson, State College, Pa., assignors to HRB-Singer, Inc., State College, Pa., a corporation of Delaware Filed Mar. 13, 1968, Ser. No. 712,660
Int. Cl. H04b 1/06
U.S. Cl. 325—329 10 Claims

ABSTRACT OF THE DISCLOSURE

Method and apparatus for automatic frequency control in a carrier eliminated single sideband receiver where the carrier frequency is approximated by first determining which of the upper or lower sidebands is received, measuring the average amplitude-limited sideband frequency of the sideband spectrum and the average amplitude-limited frequency of the modulated sideband envelope, and then estimating the suppressed carrier frequency by subtracting the aforesaid average envelope frequency from the aforesaid average sideband spectrum frequency if the upper sideband is being detected but adding the average envelope frequency to the average sideband spectrum frequency if the lower sideband frequency is detected.

BACKGROUND OF THE INVENTION

In the art of carrier-eliminated single sideband reception, an inherent frequency stability and correction problem exists. Initially, a single sideband signal, with the carrier suppressed to a level that may be considered negligible is received. The signal is heterodyned with a first oscillator in a mixer, and converted to an intermediate frequency used in single sideband circuitry. The intermediate frequency is determined in most cases by the frequency of the mechanical or crystal sideband filter. It is then common practice to further mix the intermediate frequency signal with a stable local oscillator signal in a product detector or single sideband modulator. The oscillator, usually crystal controlled, is at a frequency corresponding to that of the suppressed carrier relative to the sideband at the intermediate frequency. This oscillator is sometimes referred to as a "carrier reinsertion" oscillator.

If the first oscillator drifts, or is detuned, the resulting output signal is that of the sidebands beating with a signal having the wrong reinsertion or carrier oscillator frequency. The sound is uncomfortable when listened to and if the frequency is shifted sufficiently, it becomes completely unintelligible.

In the prior art of single sideband receiver apparatus, automatic frequency control and/or tuning indicator potentials are often obtained from discriminator networks which are fed by a pilot carrier. In addition to the above-noted apparatus, correction of the frequency shift of a carrier eliminated single sideband signal for speech communication can be obtained by recognizing that the voice has an inherent quality which is that there is an average energy frequency within the voice spectrum which is determinable and which will consistently fall within reasonably small limits of a specific frequency. It has been found that in a system having uniform response and considering that a voice speech spectrum lies between 300 and 3000 cycles, with the average energy frequency being approximately 425 cycles, a simple feedback loop can be incorporated into the system for controlling the appropriate oscillator so that the audio output has an average energy frequency of 425 cycles. One such example is U.S. Pat. 3,076,141 issued to I. D. Baumel. Baumel uses a discriminator and integrator to estimate the average frequency of the demodulated single sideband signal. The output of the discriminator is then used to correct the tuning of the receiver. A change in received signal frequency results in an equal change in the average demodulated signal frequency. This change is detected and is used to reduce but not necessarily eliminate the frequency shift. The apparatus taught by the Baumel patent, while operable, has certain limitations in that the use of only a discriminator and an integrator results in a system wherein the average frequency measurement is a function of the entire amplitude-frequency distribution of the modulation signal and also to variations in the level of modulations.

Additionally, there is no known single sideband automatic frequency control for communications systems operating on unknown channel frequencies. For a single sideband receiver operation where the transmitter frequency and the upper/lower sideband mode are unknown, only trial and error methods are used to tune in the desired signals. For channels having known frequencies, such as referred to with respect to the Baumel patent noted above, crystal oscillator techniques and feedback loops are used to reduce receiver tuning errors.

SUMMARY OF THE INVENTION

The subject invention provides an improved method and apparatus by first discriminating between the upper and lower sidebands of a single sideband signal and secondly estimating the suppressed carrier frequency by utilizing the principle of operation of a limiter circuit when the input is subjected to signals of different amplitudes and frequencies which is that when two or more signals having different frequencies and amplitudes are applied to a limiter circuit, the average value of the limiter output frequency is equal to the frequency of the stronger input signal. This is documented in a printed publication entitled, "Lectures on Communications Systems Theory," edited by Elie T. Baghdady, McGraw-Hill, 1961, at pages 490–492.

Briefly, the subject invention comprises a method and apparatus for providing automatic frequency control of a single sideband receiver by first determining which of the upper or lower sidebands is received and, secondly, estimating the frequency of the suppressed carrier signal by measuring the average amplitude-limited sideband frequency of the sideband spectrum and also the average amplitude-limited sideband modulated envelope frequency and then subtracting or adding the two, depending upon which of the two sidebands, upper or lower respectively, are received.

One embodiment of the subject invention comprises: an upper/lower sideband discriminator circuit coupled to the sideband signal in a suppressed carrier single sideband receiver, being responsive to the sideband signal to indicate which of the sidebands are present, and a carrier frequency estimator circuit coupled to said sideband signal and including, an envelope detector and first limiter means for measuring the average amplitude-limited sideband envelope frequency, second limiter means coupled to said sideband signal for measuring the average amplitude-limited sideband spectrum frequency, mixer means coupled to said first and second limiter means for providing sum and difference frequency signals at the output thereof, frequency selection means coupled to said summing circuit and controlled by said upper/lower sideband discriminator for providing either the sum or difference frequency signal at the output thereof, a second discriminator circuit coupled to said frequency selection means for providing a D.C. output signal responsive to the selected sum or difference frequency signal, and a voltage controlled oscillator coupled to said second discriminator means for providing an output signal having a frequency which is substantially equal to the suppressed carrier frequency.

DESCRIPTION OF THE PREFERRED EMBODIMENT

Figure 1:
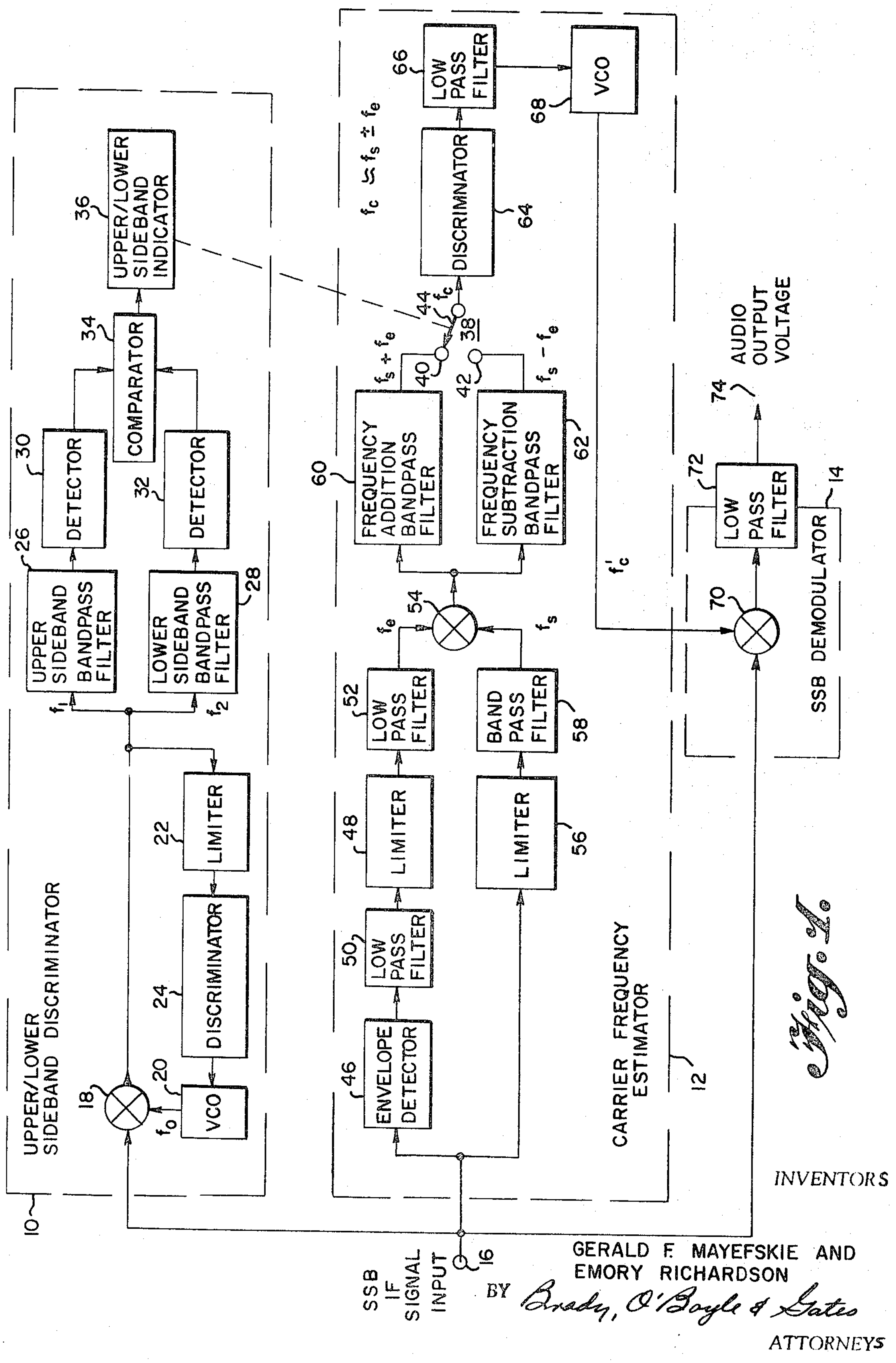
FIG. 1 is a block diagram of a preferred embodiment of the subject invention.

Referring now to FIG. 1, there is disclosed an upper/lower sideband discriminator circuit 10, a carrier frequency estimator circuit 12 and a single sideband (SSB) demodulator circuit 14, all commonly coupled to an IF single sideband (SSB) signal input terminal 16.

The upper/lower sideband discriminator 10 has the SSB IF signal coupled thereto for determining which of the two sidebands containing the intelligence information is being received and which was transmitted from a single sideband (SSB) transmitter not shown. The SSB IF signal is applied to a mixer 18 which has another input applied thereto from a voltage controlled oscillator 20. The voltage controlled oscillator 20 provides a fixed reference frequency signal $f_0$ to the mixer 18 where it is heterodyned with the SSB IF signal appearing at terminal 16. A limiter circuit 22 and a discriminator circuit 24 are coupled in series from the output of the mixer 18 to one input of the voltage control oscillator 20 for providing automatic frequency control of the oscillator.

Figure 2:
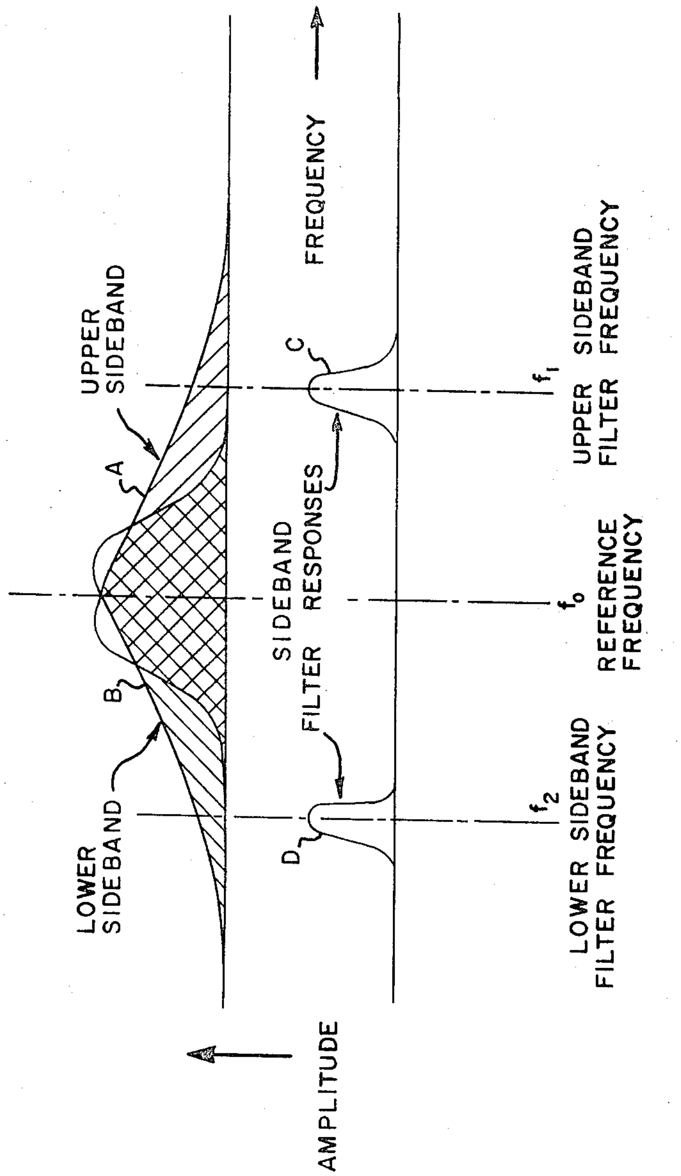
FIG. 2 is a diagram of the frequency characteristic of the upper/lower sideband discriminator.

It has been observed and shown in FIG. 2 that the SSB frequency heterodyned with the output of the voltage controlled oscillator 20 is log-normally distributed about the reference frequency $f_0$. This distribution holds for both the upper and lower sidebands. This is illustrated by waveforms A and B shown symmetrically located about the reference frequency $f_0$. Two bandpass filters 26 and 28 are coupled to the output of the mixer 18 and respectively have a frequency response which is centered about frequency $f_1$ and $f_2$ above and below the reference frequency $f_0$. Filter 26 then comprises an upper sideband bandpass filter while filter 28 comprises a lower sideband bandpass filter. FIG. 2 further illustrates the sideband filter responses by waveforms C and D for filters 26 and 28, respectively. Also, the frequency responses of the upper and lower bandpass filters 26 and 28 are sufficiently separated from the reference frequencies $f_0$ so that the occurrence of one of the sidebands will cause an output from one of the filters 26 and 28 but little or none from the other. For example, the presence of an SSB IF signal corresponding to upper sideband transmission will excite the upper sideband bandpass filter 26 and cause an output to appear therefrom while little or no output appears from the lower sideband bandpass filter 28. A first and a second detector circuit 30 and 32 are respectively coupled to the outputs of the bandpass filters 26 and 28. A signal comparator circuit 34 is coupled to the detectors 30 and 32 for providing an output indicative of the greater of the two outputs from the detectors 30 and 32.

The output of the comparator 34 is coupled to an upper/lower sideband indicator circuit 36 which is adapted to activate the switch contacts 38 comprising fixed contacts 40 and 42 and an armature contact 44. Therefore, the upper/lower sideband discriminator circuit 10 operates to detect which of the two sidebands (upper or lower) is being received and causes the armature 44 of the switch contacts 38 to make contact with either contact 40 or 42. If the upper sideband is detected, the armature will make contact with contact 42; whereas if the lower sideband is detected, it will make with contact 40.

Referring now to the carrier frequency estimator circuit 12, two signals are derived therein. The first is the average amplitude-limited modulated SSB envelope frequency $f_e$ while the second is the average amplitude-limited SSB spectrum frequency $f_s$. The envelope frequency $f_e$ is obtained by means of an envelope detector 46 coupled to the IF input terminal 16. The envelope detector 46 is coupled to a limiter circuit 48 through a low pass filter 50. A second low pass filter 52 is coupled to the output of the limiter circuit 48. As pointed out above, a limiter operates to provide an output, the average value of which is equal to the frequency of the strongest input signal applied thereto. The signal output of the limiter 48 then has a mean or average frequency of the output of the envelope detector 46. The low pass filter 52 removes any high frequency noise and provides an output therefrom equal to the frequency $f_e$ which is the average amplitude-limited SSB envelope frequency. Frequency $f_e$ is then applied to mixer 54.

Mixer 54 receives another input comprising the signal $f_s$ which is the result of the SSB IF signal appearing at terminal 16 being coupled to limiter circuit 56. The output $f_s$ is produced in a manner identical to the operation of the limiter circuit 48. The output of the limiter 56 is passed through a bandpass filter 58 for removing any unwanted frequency components and the signal having a frequency $f_s$ is then applied to the mixer 54. The mixer 54 heterodynes the signal frequencies $f_e$ and $f_s$ providing outputs of signals equal to the sum and difference ($\pm$) of frequencies $f_e$ and $f_s$. Two bandpass filters 60 and 62 are commonly coupled to the output of the mixer 54 and have respective frequency responses which are sensitive to the addition or subtraction of the frequencies $f_e$ and $f_s$. The bandpass filter 60 then provides an output which is equal to the frequency $f_s+f_e$ while the bandpass filter 62 provides an output which is equal to $f_s-f_e$.

It has been discovered that the suppressed carrier frequency of a SSB signal can be estimated by either adding or subtracting the average amplitude-limited SSB envelope frequency and the average amplitude-limited SSB spectrum frequency according to the expression $f_c \approx f_s \pm f_e$. The frequencies are either added or subtracted depending upon whether the upper or lower sideband is being received.

The approximate or estimated suppressed carrier frequency $f_c$ then is provided at the output of one of the bandpass filters 60 and 62. Since the upper/lower sideband indicator 36 provides an indication of which sideband is received, the armature 44 is automatically switched to the proper bandpass filter for providing the proper estimated carrier frequency $f_c$.

The following table is an illustrative example of experimental data for a system having an IF carrier frequency of 10.196 kc:

| | Signal source | |
|---|---|---|
| | Lower sideband, c.p.s. | Upper sideband, c.p.s. |
| Mean limited sideband spectrum frequency | 9,178 | 10,971 |
| Mean limited envelope frequency | 957 | 727 |
| Estimated carrier frequency | 10,135 | 10,244 |
| True carrier frequency | 10,196 | 10,197 |
| Carrier frequency estimation error | −61 | +48 |

The table indicates that there is an error of −61 c.p.s. for the lower sideband while there is an error of +48 c.p.s. for the upper sideband. Thus, by measuring the average frequencies of both the undemodulated SSB spectrum and the modulated SSB envelope, and subtracting or adding the frequencies depending upon whether the upper or lower sideband is received, the errors inherent in estimating the frequency of the suppressed carrier tend to cancel one another and the error is such that little or no degradation in performance is discernible.

The resultant bandpass filter output (filter 60 or filter 62) is therefore a signal $f_c$ having an instantaneously varying frequency with the mean value approximately equal to the original carrier frequency which is suppressed at the point of transmission.

Since the frequency fluctuation of the signal $f_c$ is too great to be useful as the beat oscillator in a single sideband demodulator 14, the signal $f_c$ appearing on the armature 44 is first passed through another discriminator circuit 64 which produces a D.C. output voltage proportional to the frequency $f_c$. This D.C. voltage is then filtered by a low pass filter 66 having a long time constant to remove the rapid fluctuations. This smooth votlage is then a measure of the average discriminator input frequency and is applied to a second voltage controlled oscillator 68 which produces an output signal which is a smoothed estimate of the suppressed carrier frequency $f_c$; the estimate is shown as $f_c'$ The output of the voltage control oscillator 68 is coupled to another mixer 70 in the single sideband demodulator 14 which receives as the other input the SSB IF signal appearing at input terminal 16. The demodulation of the SSB IF signal is accomplished by heterodyning the IF signal with the estimated carrier frequency $f_c'$, whereupon the desired intelligence signal is passed through a low pass filter 72 to an output terminal 74.

What has been shown and described therefore is a means of providing automatic frequency control of a single sideband receiver by determining which sideband is transmitted and then determining the mean SSB spectrum frequency and the mean SSB envelope frequency and estimating the carrier frequency by either the sum and difference of the frequencies depending upon which sideband is transmitted and received.

While the subject invention has been described with what is considered at present to be the preferred embodiment thereof, it is not meant to be considered in a limiting sense. It is desired therefore that all modifications, alterations and equivalents within the spirit and scope of the invention are herein meant to be included.

What is claimed is:

1. The method for providing automatic frequency control for a carrier eliminated single sideband receiver comprising the steps of:

determining which of the sidebands, upper or lower, is being received by said single sideband receiver;

estimating the frequency of the eliminated carrier signal by, measuring the average frequency of the amplitude-limited single sideband (SSB) spectrum received, measuring the average amplitude-limited frequency of the modulated single sideband (SSB) envelope of the signal received; and selectively adding or subtracting said average frequency of the SSB envelope and said average frequency of the SSB spectrum of frequencies depending upon whether the lower or upper sideband respectively is being received; and generating a signal substantially equal in frequency to the selected sum or difference of said average frequency of the SSB envelope and the average frequency of the SSB spectrum of frequencies.

2. Apparatus for providing automatic frequency control of a single sideband receiver responsive to a carrier eliminated single sideband signal transmitted from a transmitter, comprising the combination:

input means responsive to a single sideband (SSB) input signal;

upper/lower sideband discriminator means coupled to said input means, being responsive to said SSB input signal to provide a first output signal indicative of which of the sidebands, upper or lower, is being received;

carrier frequency estimator means coupled to said input means including, first circuit means responsive to said SSB input signal for determining the average amplitude-limited SSB spectrum frequency $f_s$ from said SSB spectrum of frequencies, second circuit means responsive to said SSB input signal for determining the average amplitude-limited envelope frequency $f_e$ of said modulated SSB input signal, first mixer circuit means coupled to said first and second circuit means for providing output signals of the sum and difference frequencies ($f_s \pm f_e$) between said average amplitude-limited SSB spectrum frequency $f_s$ and said average amplitude-limited envelope frequency $f_e$, frequency selection means coupled to said first mixer circuit means being responsive to said output signals, and additionally coupled to said sideband discriminator means and being controlled thereby for selecting either the sum ($f_s + f_e$) or difference ($f_s - f_e$) frequency signal in response to the presence of the lower or upper sideband, respectively;

and third circuit means for providing an output having a signal frequency substantially equal to the selected sum ($f_s + f_e$) or difference ($f_s - f_e$) frequency, being a signal substantially equal in frequency to the suppressed carrier frequency $f_c$, according to the expression $f_c \approx f_s - f_e$.

3. The invention as defined by claim 2 wherein said sideband discriminator means comprises:

second mixer circuit means coupled to said input means and receiving said SSB input signal as a first input, reference oscillator means coupled to said second mixer circuit means for providing a reference frequency $f_0$ signal input thereto and providing an output comprising a heterodyned signal of said SSB input signal and said reference frequency, and filter means coupled to said second mixer circuit means being responsive to said heterodyned signal to provide an output signal indicative of the reception of either the upper or lower sideband of said carrier eliminated single sideband signal.

4. The invention as defined by claim 3 wherein said filter means comprises an upper sideband bandpass filter and a lower sideband bandpass filter, and additionally including detector means coupled thereto, and comparator circuit means coupled to said detector means for providing said output signal indicative of said upper or lower sideband.

5. The invention as defined by claim 3 wherein said reference frequency oscillator comprises a voltage control oscillator and additionally including automatic frequency control means for maintaining said reference frequency at the predetermined value $f_0$, said automatic frequency control circuit comprising limiter circuit means coupled to said second mixer means being responsive to the heterodyned signal to provide an output signal the average value of the frequency of which is equal to the frequency $f_0$ of the reference frequency of the voltage control oscillator, and discriminator circuit means coupled between said limiter circuit means and said voltage controlled oscillator for providing a correction signal thereto for maintaining said reference frequency at said predetermined value $f_0$.

6. The invention as defined by claim 2 wherein said first circuit means comprises another limiter circuit means responsive to said SSB input signal for providing a signal having a frequency $f_s$ which is substantially equal to the average spectrum frequency of the SSB frequency spectrum, and wherein said second circuit means comprises, an envelope detector for providing the modulated envelope of the SSB input signal and still another limiter circuit means coupled to said envelope detector for providing a signal having a frequency $f_e$ which is substantially equal to the average frequency of the amplitude-limited SSB envelope.

7. The invention as defined by claim 6 wherein said first circuit means includes bandpass filter means coupled between said another limiter circuit means and said first mixer circuit means, and wherein said second circuit means additionally includes a first low pass filter coupled between said envelope detector and said still another limiter circuit means and a second low pass filter coupled between said first mixer circuit and said still another limiter circuit means.

8. The invention as defined by claim 2 wherein said frequency selective means comprises a first frequency bandpass filter having a frequency response in the order of $f_s+f_e$ and a second frequency bandpass filter having a frequency response in the order of $f_s-f_e$ and additionally including switch means coupled to said first and second bandpass filters and being controlled by said sideband discriminator circuit means for selecting the signal having the frequency $f_s+f_e$ or $f_s-f_e$ depending upon which of the sidebands, lower or upper, respectively, is received.

9. The invention as defined by claim 2 and wherein said third circuit means comprises another discriminator circuit coupled to said frequency selection means and being responsive to the selected frequency $f_s+f_e$ or $f_s-f_e$ for producing a D.C. voltage proportional to the frequency $f_c$, filter means coupled to said another discriminator means for removing any high frequency fluctuations in said D.C. voltage, and second voltage control oscillator means coupled to said filter means and being responsive to said D.C. voltage for providing an output signal which is substantially equal in frequency to the suppressed carrier frequency.

10. The invention as defined by claim 2 and additionally including SSB demodulator circuit means coupled to said third circuit means and said input means for providing an audio output signal.

References Cited

UNITED STATES PATENTS

| | | | |
|---|---|---|---|
| 3,076,141 | 1/1963 | Baumel | 325—329 |
| 3,286,183 | 11/1966 | Bergemann | 325—329 |
| 3,329,899 | 7/1967 | Holder | 325—329 |

ROBERT L. GRIFFIN, Primary Examiner

K. W. WEINSTEIN, Assistant Examiner

U.S. Cl. X.R.

325—330, 331